(No Model.)

C. ORTH.
VEGETABLE CUTTER.

No. 460,267. Patented Sept. 29, 1891.

Witnesses:

Christian Orth,
Inventor:

By Wm N Moore,
Attorney.

UNITED STATES PATENT OFFICE.

CHRISTIAN ORTH, OF FORT WAYNE, INDIANA.

VEGETABLE-CUTTER.

SPECIFICATION forming part of Letters Patent No. 460,267, dated September 29, 1891.

Application filed April 27, 1891. Serial No. 390,640. (No model.)

*To all whom it may concern:*

Be it known that I, CHRISTIAN ORTH, a citizen of the United States, residing at Fort Wayne, in the county of Allen and State of Indiana, have invented certain new and useful Improvements in Vegetable Cutters or Slicers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in vegetable cutters or slicers; and one of the objects of my invention is the provision of a device of this character which will cut or slice the vegetables quickly and which will make the slices of any desired thickness.

Another object of my invention is the provision of a vegetable-slicer which will be easy to operate, so as not to fatigue the operator, which will be of simple and durable construction and not be likely to get out of order, and which will be inexpensive of production.

To attain the desired objects the invention consists of a vegetable slicer or cutter constructed substantially as herein illustrated, described, and particularly defined by the claim.

Figure 1:
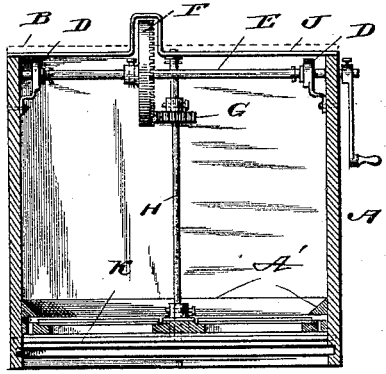
Figure 2:
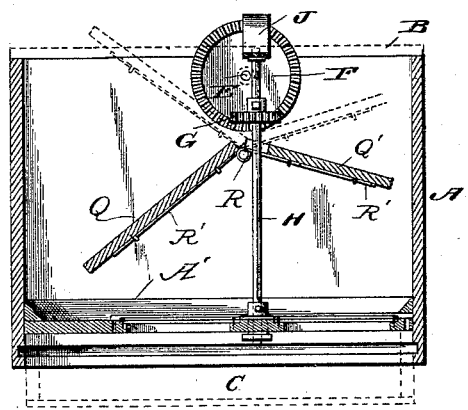
Figure 3:
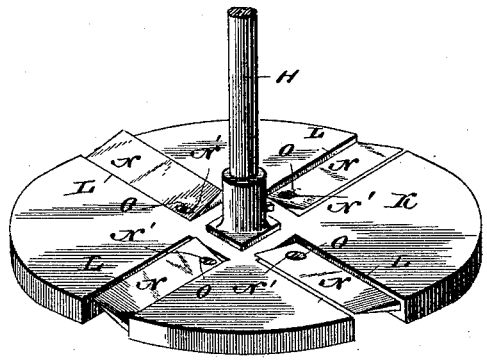
Figure 4:
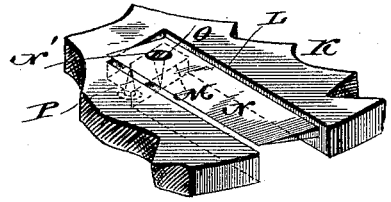

Figure 1 represents a longitudinal section of a vegetable-slicer constructed in accordance with my invention. Fig. 2 represents a transverse section thereof. Fig. 3 represents a detail view of the disk and the knives carried thereby, and Fig. 4 represents a detail view of one of the knives and the adjusting and fastening means therefor.

Referring by letters to the drawings, in which similar letters of reference denote corresponding parts in all the figures, A designates the casing or housing of my improved slicer, which is of convenient size and shape for the desired purpose, and in this instance is rectangular, and is provided with a hinged lid or cover B, and a drawer or receptacle C to receive the fruit after it has been sliced.

The casing or housing is provided at the lower inner edge with inclined strips A', which serve to direct the vegetables or fruit to the knives, and the disk carrying the knives is arranged near one end of the box, or away from the center. This construction and arrangement prevents the material from crowding or forcing its way to the cutters, and also allows the casing to be entered easily to attend to the cutters and for other purposes.

In angle brackets or hangers D, secured to the sides of the casing, I mount the transverse horizontal shaft E, carrying the large driving gear-wheel F, which meshes with the pinion G, carried by the vertical shaft H, having the upper end mounted in the plate J and the lower end mounted in a boss on the disk K. From this construction it will be seen that the rotation of the horizontal shaft by means of the crank attached thereto through the medium of the large gear-wheel and pinion causes the vertical shaft to revolve and the disk carried thereby.

The disk K is formed with a series of kerfs or passages L, which extend outward from near the center thereof to the periphery, and at their inner ends are formed with shoulders M, and to said shoulders are secured the inner ends of the blades or knives N. The knives are formed with openings N', through which pass fastening screws or bolts O and enter the shoulders M, and through the shoulders on the under face pass screws or bolts P, which engage the under face of the knives, and in connection with the screws or bolts O fasten the blades in place at an incline to the disk with the cutting-edge projecting above the upper face of said disk for a well-known purpose. The screws or bolts which engage the under face of the knives, it will be seen, can be operated to vary the angle of inclination of the blades, and thus cause said blades to cut slices of different thicknesses, as may be desired.

In order that the vegetables may be fed properly to the cutting-knives, I employ a presser or follower, which consists of two boards or plates Q and Q', the former being provided with an opening to receive the vertical shaft and permit the follower to move thereon, and these boards are connected by a spring having the coil R and the arms R', which are secured to the boards, and serve to force the said boards against the vegetables and, as is evident, push them against the knives.

The operation of my invention will be readily understood from the foregoing description, taken in connection with the drawings, and I will merely say that the vegetables are placed in the casing, and by the spring-actuated follower are forced against the disk, which being revolved, as described, causes the knives to act on the vegetables, slicing or cutting them, and after being sliced the slices pass through the kerfs in the disk and fall into the drawer or receptacle, thus effecting the slicing in a rapid, easy, and perfect manner.

I claim as my invention—

In a cutter or slicer, the combination of the oblong casing, the disk mounted in the casing, having the kerfs formed with shoulders, the knives arranged in the kerfs, the screws passing through the knives into the shoulders, the screws passing through the shoulders and engaging the knives, the shaft carrying the disk, the gear-wheels, and follower consisting of the two boards, and the spring having the coil and the ends connected to the boards, as shown and described.

In testimony whereof I affix my signature in presence of two witnesses.

CHRISTIAN ORTH.

Witnesses:
JOHN J. BECKER,
JOSEPH CHRISTIE.